Feb. 22, 1966  R. L. BENNETT ETAL  3,236,031
WET DUST SEPARATOR
Filed April 25, 1963

INVENTORS.
RICHARD L. KLINE
ROBERT L. BENNETT
BY
*Ralph B. Brick*
ATTORNEY

United States Patent Office
3,236,031
Patented Feb. 22, 1966

3,236,031
WET DUST SEPARATOR
Robert L. Bennett and Richard L. Kline, Louisville, Ky., assignors to American Air Filter Company, Inc., Louisville, Ky., a corporation of Delaware
Filed Apr. 25, 1963, Ser. No. 275,675
8 Claims. (Cl. 55—238)

This invention relates to dust separators or concentrators of the cyclone type and more particularly to improved wet dust separators of the vortexing straight-through type similar to that set forth in assignee's co-pending application Serial No. 854,959, filed November 23, 1959, inventor, Karl L. Westlin, now Patent No. 3,104,961.

The present invention finds application in dust separators of the type wherein the dirty gas stream is introduced tangentially into a cylindrical body to whirl the dirty gas as it travels axially along the cylindrical body, thereby concentrating the dust load in the gas to the outer portion of the gas stream so that clean gas can be removed from the central portion thereof. In particular, the present invention finds application in such type separators which further contact the whirling gas with a liquid so that dust particles thrown outwardly by the whirling action of the gas are entrapped by the liquid and removed from the gas along with the removal of the liquid.

In accordance with the present invention, an improved cyclonic concentrator arrangement of the gas-liquid contact type is provided which is capable of efficiently treating large volumes of gas with a minimum of resistance to the treated gas stream. In addition the present invention provides a novel gas-liquid contact arrangement which insures a thorough and effective gas-liquid contact in a straight-forward and economic manner, utilizing a minimum of liquid to accomplish the effective contact.

Various other features of the present invention will become obvious to one skilled in the art upon reading the disclosure set forth hereinafter.

More particularly, the present invention provides a dust separator for separating dust particles from a gaseous stream comprising: longitudinally extending cyclonic dust concentrating chamber means including a substantially frusto conical like section at one end thereof tapering outwardly from the apex to the base of the section; gas inlet means in the form of a longitudinal slot peripherally disposed along the side wall of the frusto conical like section of the chamber means, the slot extending along a portion of the length of the section from apex to base to open adjacent an inner side wall of the section to deliver dirty gas tangentially into the chamber means to vortex such dirty gas and concentrate the dust content along the inner side wall of the chamber means with the clean gas stream passing along the inner portion of the chamber means adjacent the longitudinal axis thereof; liquid inlet means removed from the gas inlet means away from the dirty gas flow path therethrough but directed toward the dirty gas flow path from a position adjacent the apex of the conical type section and upstream the gas inlet means to cooperate with the dirty gas passing through the inlet means so that such dirty gas enters through the inlet means and entrains the liquid therewith to provide a sheet of liquid concentrated along the side wall of the chamber means to form a liquid curtain over the gas inlet means through which subsequent dirty gas entering into the chamber must flow; the frusto conical like section having a cross section including a flat straightaway portion and a successive curved portion, such portions extending along a part of the length thereof and preceding the leading edge of the gas inlet means to impart a turbulence to the liquid curtain formed over the gas inlet means; and, outlet means in the chamber means downstream of the inlet means, the outlet means including a clean gas outlet to receive the clean gas stream passed along the inner portion of the chamber adjacent the longitudinal axis thereof and a gas-liquid outlet to receive the gas-liquid concentrated along the side wall of the chamber.

It is to be understood that various changes can be made in the arrangement, form, and construction of the apparatus disclosed herein by one skilled in the art without departing from the scope or spirit of the present invention.

Referring to the drawing which discloses one advantageous embodiment of the present invention:

Figure 4:
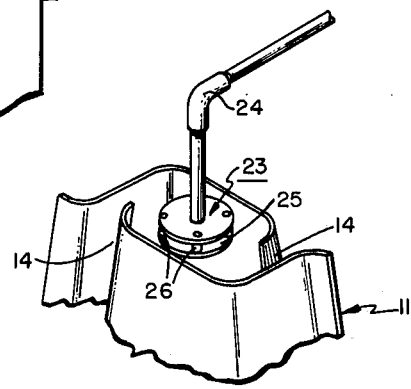
Figure 5:
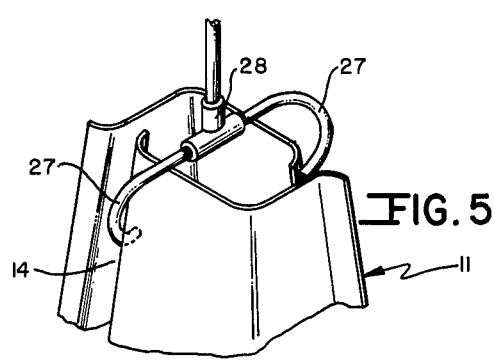

FIGURE 4 is an enlarged fragmentary perspective view at the apex of one of the conical type sections of the dust separator assembly disclosing one manner of introducing liquid into the separator; and, FIGURE 5 is an enlarged fragmentary perspective view at the apex of one of the conical type sections of the dust separator assembly disclosing a further manner of introducing liquid into the separator.

Figure 1:
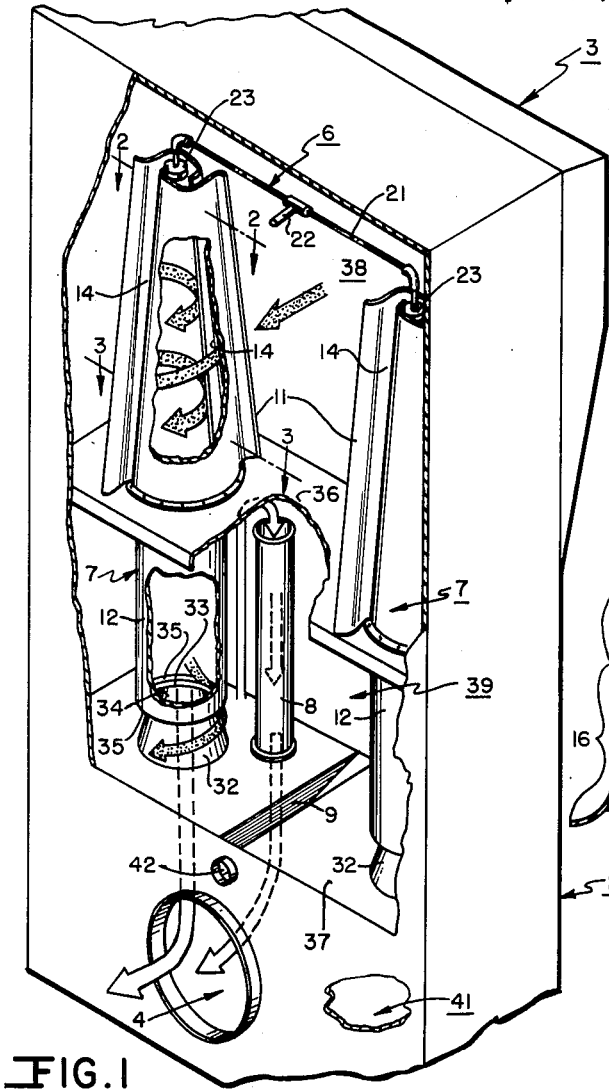
FIGURE 1 is a partially broken away perspective view of a dust separator assembly incorporating the features of the present invention.

As disclosed in FIGURE 1 of the drawing, the dust separator assembly incorporating the present invention includes an elongated vertical housing 2 having upstream dirty gas inlet 3 in the upper part of housing 2 and spaced downstream clean gas outlet 4 in the lower part of the housing. Positioned along the upstream portion of housing 2 adjacent to the top thereof is liquid supply unit 6. Liquid supply unit 6 is arranged to communicate with longitudinally extending cyclone dust concentrating chamber members 7 positioned in spaced vertically extending fashion in housing 2 downstream of the liquid supply unit. Liquid supply unit 6 and dust concentrators 7 comprise the primary system of the present invention. In the disclosed embodiment, only two vertically extending dust concentrating members are utilized. However, it is to be understood that the present invention is not limited to the particular arrangment disclosed and other arrangements, including a different number of dust concentrators, can be used if desired.

Communicating with dust concentrators 7 is a vertically extending gas-liquid separating stand-pipe 8 and drain trough 9, the stand-pipe 8 and drain trough 9 forming a portion of the secondary system of the present invention.

Referring more specifically to dust concentrators 7, advantageously they are similar in many respects to the concentrators disclosed in the aforementioned patent application No. 854,959, now Patent No. 3,104,961. Each concentrator 7 includes an elongated hollow body portion having an inlet end section 11 and an outlet end section 12 positioned in end-to-end relationship to constrain the gas stream being treated to flow axially in one direction from the inlet section through the outlet section and through the outlet end thereof. The inlet end section 11 serves to provide a conical-type space which increases cross sectionally in the axial direction of gas flow. In accordance with the present invention, each inlet section 11 is provided with a pair of gas inlet slots 14, peripherally disposed along the side wall of the end section to extend vertically along the length thereof. Each slot 14 is positioned and contoured to deliver gas tangentially into the conical type end section 11 substantially throughout the length thereof to vortex the gas therein and concentrate the dust content in the outer portion of the gas stream as the stream approaches the larger or base end of the section. If desired, each slot 14 can taper lengthwise to increase slightly in width from the smaller or apex end of section 11 to the larger or base end thereof. The rate of this taper can be such as to maintain throughout the length of each inlet section a substantially constant ratio of slot area to cone area at corresponding points. Although each slot 14 is disclosed as extending in a straight axial direction, it is to be understood that it also can be curved as it proceeds axially toward the base of its inlet section.

Figure 2:
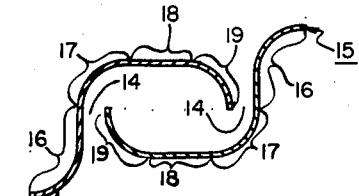
FIGURE 2 is an enlarged horizontal schematic cross-sectional view of a portion of the apparatus of FIGURE 1 taken in a plane passing through line 2—2 at the apex of one of the conical type sections of the dust separator assembly.
Figure 3:
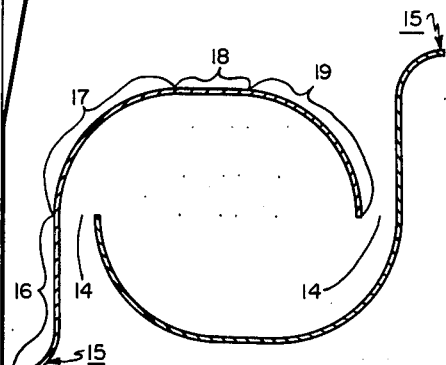
FIGURE 3 is an enlarged horizontal schematic cross-sectional view of a portion of the apparatus of FIGURE 1 taken in a plane passing through line 3—3 at the base at one of the conical type sections of the dust separator assembly.

As disclosed in FIGURES 1–3 of the drawing, the conical type inlet end section 11 advantageously can be constructed from two substantially identical longitudinally extending wall members 15 of hook-shape cross-section throughout, such hook-shape cross-section including an upstream leg portion 16, followed successively by a curved elbow portion 17, a flat or straightaway portion 18 and a curved downstream leg portion 19 (FIGURE 2). Wall members 15 can be fastened together by a suitable fastening arrangement to include an apex roof (not shown), the connected wall members being in spaced facing and approximately interlocking relationship to each other with the downstream leg portion 19 of each member spaced opposite the curved elbow portion 17 of the other member to provide slot pairs 14. Thus, as disclosed, each slot 14 is bounded by a spaced curved elbow portion 17 and a downstream leg portion 19 of the wall members 15. It is to be noted that portions 17 and 19 are so arranged relative each other that the slots 14 formed therebetween taper inwardly in the general direction of gas flow therethrough. It also is to be noted that upstream leg portions 16 of each wall member 15 are more or less tangential extensions of the conical-like section 11 formed by such facing wall members. Moreover, it is to be noted that preceding each downstream leg portion 19 is the flat or straightaway wall portion 18, the straightaway wall portion 18 of one wall member 15 being in spaced substantially parallel relationship to the straightaway wall portion 18 of the opposite wall member 15. As can be seen in FIGURES 2 and 3 of the drawing, the distance between the parallel straightaway portions 18 of the wall members at the apex of each section 11 is substantially less than the distance at the base of such section. Advantageously, the ratio of the distances between parallel straightaway sections 18 at the base to the apex can be in the range of approximately 3/1 to 6/1 and preferably the ratio can be approximately 4.17/1. These above ratios can apply for conical type sections of various lengths. However, it is to be noted that the usual length of conical type section varies from five (5) inches to fifty (50) inches. As will be seen hereinafter, the straightaway portions 18 of a conical type section 11 precede curved downstream leg portions 19 and the leading edge of the liquid curtains formed over slots 14 to impart a turbulence to such liquid curtain because of the abrupt change in the flow path from the straightaway portion 18 to the downstream leg portion 19.

Referring to FIGURE 1 of the drawing, it can be seen that liquid supply unit 6 is arranged to communicate with the top end of each of the inlet end sections 11 so that the liquid inlet is, in fact, removed from and directed toward the dirty gas to be treated at a position adjacent the apex of sections 11. The liquid supply unit 6 includes a header conduit 21 connected by a T-section 22 to a suitable source of liquid supply (not shown). At each end of header conduit 21 a radial liquid distributor 23 can be fastened through an elbow and branch pipe assembly 24, each distributor 23 being positioned to extend into the apex of a conical-type section 11. Liquid distributor 23 includes a pair of spaced disc members 25 spaced from each other by spacer bar members 26 positioned between the disc members adjacent their peripheries. Spaced disc members 25 are arranged to extend normal to the longitudinal axis of the conical type portion of the chamber to deliver liquid to the side wall thereof.

It is to be understood that the present invention is not to be considered as limited to the particular type liquid distributor set forth in FIGURE 4. If desired a liquid distributor such as that disclosed in FIGURE 5 can be utilized. The liquid distributor in FIGURE 5 is in the form of a bull-horn and includes a pair of horn-like conduits 27 arranged to extend from a branch and T-section 28 connected to main conduit 21 so as to direct liquid tangentially into each of the liquid slots 14 at the apex portion of the conical-type section 11.

Connected to each of inlet end sections 11 at the base portion thereof is one end of outlet end section 12. As set forth in U.S. Patent No. 2,806,550, the area of the connecting ends of the inlet and outlet sections 11 and 12 advantageously should be equal or at least of magnitudes which avoid abrupt changes so as to distort gas flow conditions. Each outlet end section 12 provides a cylindrical continuation of gas flow space proceeding axially from the outlet end of inlet section 11. This cylindrical continuation can be conical and of either increasing or decreasing cross-sectional area in the direction of actual air flow. Advantageously, however, it is in the form of a true cylinder of uniform cross-sectional area, which functions to accommodate the axially flowing vortex created in the inlet section, and gives the gas borne particles additional time to concentrate along with the liquid in the outer portion of the gas stream. It is to be understood that the length of this section should neither be too small or too large if optimum operating conditions are to be achieved.

Referring to FIGURE 1 of the drawing, it can be seen that the end of each outlet end section 12 opposite that end connected to inlet end section 11 is provided with a conical gas outlet pipe 32 which terminates at its small end and in outwardly directed deflector in the form of an annular flange. Conical pipe 32 serves to divide the outlet end of outlet section 12 into an inner axially disposed clean gas outlet 34 which communicates with the clean gas outlet 4 of the primary system of the main housing and an outer annular dust chamber or ring 35 which receives the outer portion of the gas stream containing the concentrated dust and liquid to pass it to the secondary system of the main housing, as will be described hereinafter.

As can be seen in FIGURE 1, dust concentrators 7 are arranged in vertically extending, spaced parallel relationship to each other with their upstream ends projecting through suitable openings in upstream wall 36 and their downstream ends connected to suitable openings in downstream wall 37, the vertically spaced upstream and downstream walls 36 and 37 extending transversely across housing 2 to divide the housing 2 into dirty gas plenum 38, gas-liquid plenum 39, and clean gas plenum 41. The downstream wall 37 serves to support vertical standpipe 8 of the secondary system and such downstream wall further includes drain trough 9 of the secondary system, drain trough 9 communicating with drain outlet 42 positioned in the lower portion of housing 2. Suitable piping (not shown) can be connected to drain outlet 42 to conduct dirty liquids away for cleaning and recirculation if desired.

In a typical operation of the aforedescribed inventive apparatus, liquid is fed from a suitable supply source by main conduit 21 through the liquid distributors to be introduced into the apex of each of the conical type sections 11 of the dust separator assembly. At the same time that liquid is fed into the system, dirty gas passes through dirty gas inlet 3 and through slots 14 of the inlet end sections 11 of the dust concentrators 7. Since the gas enters tangentially, it creates a vortex in the inlet end sections 11, subjecting the dust particles therein to intense centrifugation. Simultaneously, liquid entering into each of the conical type sections at the apex also is centrifuged as a thin liquid film along the walls of the conical type sections by the centrifuging gas, the film forming a curtain over the inlet slots 14 through which the dirty gas passing into the system must flow. Since the straightaway portions 18 in each of the inlet sections precedes the curved downstream leg portions 19 and the leading edge of the liquid curtains over the slots 14 a turbulent effect is created as the liquid curtain passes over slots 14 to insure more effective gas-liquid contact as the gases pass through slots 14 and into sections 11. As the result of this action, more of the dust particles in the gas passing through the liquid curtain tend to be entrapped by the liquid at this stage of the operation. The remaining dust particles are centrifuged to concentrate along the outer portion of the gas flow as it moves toward the outlet end sections 12 of the concentrators 7. The length of each of the outlet end sections 12 is designed to give such remaining particles sufficient time to concentrate in the outer portions before they reach the separating area. Since a liquid film is formed along the outer walls of the outlet sections by the centrifuging gas, the remaining particles, rather than strike the walls of the concentrator and bounce back into the main stream are entrapped by the liquid film and passed off therewith. Thus, a more efficient separator in the primary system is insured. Upon reaching the separating area in the primary system, the centrally disposed clean gas passes along the primary system through clean gas outlets 34 while the outer portion of the gas stream, containing the concentrated dust and liquid, passes through dust chamber rings 35 into the secondary system. At this point the gas-liquid separator assembly including stand-pipe 8 comes into operation to separate the gas from the liquid, the gas passing through stand-pipe 8 while the liquid with the dust contained therein passes off through drain trough 9 to drain outlet 42 of housing 2. As aforementioned, the liquid can be recirculated through a filter back to the liquid supply and control unit 6 if desired, or can be sent to a settling sump and distributed from that point.

The invention claimed is:

1. A dust separator for separating dust particles from a gaseous stream comprising: longitudinally-extending cyclonic dust concentrating chamber means including a substantially frusto-conical like section at one end thereof tapering outwardly from the apex to the base of said section; gas inlet means in the form of a longitudinal slot peripherally disposed along the side wall of said frusto-conical like section of said chamber means, said slot extending along a portion of the length of said section between apex and base to open adjacent an inner side wall of said section to deliver dirty gas tangentially into said chamber means to vortex such dirty gas and concentrate the dust content along the inner side wall of said chamber means with the clean gas stream passing along the inner portion of said chamber means adjacent the central longitudinal axis thereof; liquid inlet means removed from said gas inlet means and directed toward the dirty gas flow path from a position adjacent the apex of said frusto-conical like section and upstream of said gas inlet means to cooperate with the dirty gas passing through said gas inlet means so that as such gas enters the gas inlet means it entrains the liquid therewith to provide a sheet of liquid concentrated along the side wall of said chamber means to form a liquid curtain over said gas inlet means through which subsequent dirty gas entering into said chamber means must flow; said frusto-conical like section including a longitudinally-extending first straightaway portion lying in a flat, longitudinally-extending plane adjacent said gas inlet means for tangential introduction of gas thereinto, a successive longitudinally-extending first centrifuging curved portion, a successive longitudinally-extending second straightaway portion lying in a flat, longitudinally-extending plane to taper outwardly from the apex to the base of said section, and a successive longitudinally-extending second centrifuging curved portion, such portions cooperating with said gas inlet means to impart a turbulence to said liquid curtain formed over said gas inlet means; and outlet means in said chamber means downstream of said inlet means, said outlet means including a clean gas outlet to receive the clean gas stream passed along the inner portion of said chamber means adjacent the longitudinal axis thereof and a gas-liquid outlet to receive the gas-liquid concentrated along the side wall of said chamber means.

2. A dust separator for separating dust particles from a gaseous stream comprising: longitudinally-extending cyclonic dust concentrating chamber means including a substantially frusto-conical like section at one end thereof tapering outwardly from the apex to the base of said section; a pair of gas inlet means in the form of longitudinal sllots peripherally disposed along the side wall of said frusto-conical like section of said chamber means, said slots extending along a portion of the length of said section between apex and base to open adjacent an inner side wall of said section to deliver dirty gas tangentially into said chamber means to vortex such dirty gas and concentrate the dust content along the inner side wall of said chamber means with the clean gas stream passing along the inner portion of said chamber means adjacent the central longitudinal axis thereof; liquid inlet means removed from said gas inlet means and directed toward the dirty gas flow path from a position adjacent the apex of said frusto-conical like section and upstream of said gas inlet means to cooperate with the dirty gas passing through said inlet means so that as such gas enters the inlet means it entrains the liquid therewith to provide a sheet of liquid concentrated along the side wall of said chamber means to form a liquid curtain over each of said pair of gas inlet means through which subsequent dirty gas entering into said chamber means must flow; said frusto-conical like section including a pair of substantially identical spaced and facing wall portions, each having a longitudinally-extending first straightaway portion lying in a flat, longitudinally-extending plane adjacent said gas inlet means for tangential introduction of gas thereinto, a successive longitudinally-extending first centrifuging curved portion, a successive longitudinally-extending second straightaway portion lying in a flat, longitudinally-extending plane to taper outwardly from the apex to the base of said section, and a successive longitudinally-extending second centrifuging curved portion, such portions cooperating with said gas inlet means to impart a turbulence to said liquid curtains formed over said gas inlet means; and outlet means in said chamber means downstream of said inlet means, said outlet means including a clean gas outlet to receive the clean gas stream passed along the inner portion of said chamber means adjacent the longitudinal axis thereof, and a gas-liquid outlet to receive the gas-liquid concentrated along the side wall of said chamber means.

3. The apparatus of claim 2, said liquid inlet means comprising a main conduit and a pair of secondary conduits extending therefrom positioned to direct liquid along the inner wall of said chamber means tangentially into each of said pair of gas inlet means.

4. The apparatus of claim 2, said liquid inlet means comprising a main conduit having a radial liquid distributor fastened thereto and positioned to extend into the apex of said frusto-conical like section of said chamber means, said distributor including a pair of spaced disc members spaced from and extending normal to the longitudinal axis of said frusto-conical like section of said chamber means to deliver liquid uniformly to the inner side wall thereof.

5. A dust separator for separating dust particles from a gaseous stream comprising: longitudinally-extending cyclonic dust concentrating chamber means including a substantially frusto-conical like section at one end thereof tapering outwardly from the apex to the base of said section; a pair of gas inlet means in the form of longitudinal slots peripherally disposed along the side wall of said frusto-conical like section of said chamber means, said slots extending along a portion of the length of said section between apex and base to open adjacent an inner side wall of said section to deliver dirty gas tangentially into said chamber means to vortex such dirty gas and concentrate the dust content along the inner side wall of said chamber means with the clean gas stream passing along the inner portion of said chamber means adjacent the central longitudinal axis thereof; liquid inlet means removed from said gas inlet means and directed toward the dirty gas flow path from a position adjacent the apex of said frusto-conical like section and upstream of said gas inlet means to cooperate with the dirty gas passing through said inlet means so that as such gas enters the inlet means it entrains the liquid therewith to provide a sheet of liquid concentrated along the side wall of said chamber means to form a liquid curtain over each of said pair of gas inlet means through which subsequent dirty gas entering into said chamber must flow; said frusto-conical like section including a pair of substantially identical spaced and facing wall portions, each having a longitudinally-extending first straightaway portion lying in a flat longitudinally-extending plane adjacent said gas inlet means for tangential introduction of gas thereinto, a successive longitudinally-extending first centrifuging curved portion, a successive longitudinally-extending second straightaway portion lying in a flat, longitudinally-extending plane to taper outwardly from the apex to the base of said section, and a successive longitudinally-extending second centrifuging curved portion, said second straightaway portions of said pair of wall portions being in spaced parallel relationship to each other, such portions cooperating with said gas inlet means to impart a turbulence to said liquid curtains formed over said inlet means; and outlet means in said chamber means downstream of said inlet means, said outlet means including a clean gas outlet to receive the clean gas stream passed along the inner portion of said chamber means adjacent the longitudinal axis thereof and a gas-liquid outlet to receive the gas-liquid concentrated along the side wall of said chamber means.

6. The apparatus of claim 5, the ratio of the distance between said spaced parallel second straightaway portions at the base of said frusto-conical like section to such distance at the apex of said frusto-conical like section being in the range of approximately 3 to 1 to 6 to 1.

7. The apparatus of claim 6, said ratio being approximately 4.17 to 1.

8. A dust separator for separating dust particles from a gaseous stream comprising: a housing having a primary system and a secondary system; vertical extending cyclonic dust concentrating chamber means in said primary system including a substantially frusto-conical like section at one end thereof tapering outwardly from the apex to the base of said section; a pair of gas inlet means in the form of longitudinal slots peripherally disposed along the side wall of said frusto-conical like section of said chamber means, said slots extending along a portion of the length of said section between apex and base to open adjacent an inner side wall of said section to deliver dirty gas tangentially into said chamber means to vortex such dirty gas and concentrate the dust content along the inner side wall of said chamber means with the clean gas stream passing along the inner portion of said chamber means adjacent the central longitudinal axis thereof; liquid inlet means removed from said gas inlet means and directed toward the dirty gas flow path from a position adjacent the apex of said frusto-conical like section and upstream of said gas inlet means to cooperate with the dirty gas stream passing through said inlet means so that as such gas enters the inlet means it entrains liquid therewith to provide a sheet of liquid concentrated along the side wall of said chamber means to form a liquid curtain over each of said pair of gas inlet means through which subsequent dirty gas entering into said chamber means must flow; said liquid inlet means comprising a main conduit having a radial liquid distributor fastened thereto and positioned to extend into the apex of said frusto-conical like section of said chamber means; said distributor including a pair of spaced, horizontal disc members extending normal to the longitudinal axis of said frusto-conical like section of said chamber means to deliver liquid to the side wall thereof; said frusto-conical like section including a pair of substantially identical spaced and facing wall portions, each having a longitudinally-extending first straightaway portion lying in a flat, longitudinally-extending plane adjacent said gas inlet means for tangential introduction of gas thereinto; a successive longitudinally-extending first centrifuging curved portion, a successive longitudinally-extending second straightaway portion lying in a flat, longitudinally-extending plane to taper outwardly from the apex to the base of said section, and a successive longitudinally-extending second centrifuging curved portion, said second straightaway portions of said pair of wall portions being in spaced parallel relationship to each other, such portions cooperating with said gas inlet means to impart a turbulence to the liquid curtains formed over said gas inlet means, the ratio of the distance between spaced, parallel straightaway portions at the base of the frusto-conical like section to such distance at the apex of said frusto-conical like section being approximately 4.17 to 1; outlet means downstream of said gas inlet means and including a clean gas outlet to receive the clean gas stream passed along the inner portion of said chamber means adjacent the longitudinal axis thereof, and gas-liquid outlet means to receive the gas-liquid concentrate along the side wall of said chamber means; and a vertical gas-liquid separating standpipe in said secondary system of said housing to connect said gas-liquid outlet of said secondary system to said clean gas outlet of said primary system to combine the separated gas of said secondary system with the clean gas of said primary system.

References Cited by the Examiner

UNITED STATES PATENTS

| 397,363 | 2/1889 | Hoke | 55—83 |
|---|---|---|---|
| 435,165 | 8/1890 | Ash | 55—455 XR |
| 1,272,274 | 7/1918 | Kinealy | 239—524 X |
| 1,886,548 | 11/1932 | Horne et al. | 55—238 |
| 2,247,285 | 6/1941 | Bingman | 55—241 X |
| 2,281,610 | 5/1942 | Watson et al. | 55—348 X |
| 2,351,864 | 6/1944 | Linderman | 261—112 X |
| 2,546,246 | 3/1951 | Whiton et al. | 55—349 |
| 2,553,175 | 5/1951 | Davenport et al. | 55—348 X |
| 2,687,780 | 8/1954 | Culhane | 55—241 XR |
| 2,804,169 | 8/1957 | Olah | 55—455 XR |
| 2,806,550 | 9/1957 | Westlin | 55—349 XR |
| 3,020,819 | 2/1962 | Kunen | 239—524 X |
| 3,104,961 | 9/1963 | Westlin | 55—466 XR |

ROBERT F. BURNETT, *Primary Examiner.*

HARRY B. THORNTON, *Examiner.*